Oct. 15, 1968  W. L. ULLMAN ETAL  3,406,231
METHOD FOR PRODUCTION OF TUBULAR FIBROUS BODIES
Filed Jan. 20, 1964  3 Sheets-Sheet 1

INVENTORS
WILLIAM L. ULLMAN, JAMES C. BAXTER,
ARTHUR J. PEARSON, ROBERT E. DAVIS
& WILLIAM B. HULLHORST
BY Staelin & Overman
ATTORNEYS Oct. 15, 1968  W. L. ULLMAN ET AL  3,406,231

METHOD FOR PRODUCTION OF TUBULAR FIBROUS BODIES

Filed Jan. 20, 1964  3 Sheets-Sheet 2

INVENTORS
WILLIAM L. ULLMAN, JAMES C. BAXTER,
ARTHUR J. PEARSON, ROBERT E. DAVIS
& WILLIAM B. HULLHORST
BY Staelin & Overman
ATTORNEYS Oct. 15, 1968   W. L. ULLMAN ETAL   3,406,231
METHOD FOR PRODUCTION OF TUBULAR FIBROUS BODIES
Filed Jan. 20, 1964   3 Sheets-Sheet 3

INVENTORS
WILLIAM L. ULLMAN, JAMES C. BAXTER,
ARTHUR J. PEARSON, ROBERT E. DAVIS
& WILLIAM B. HULLHORST
BY Staelin & Overman
ATTORNEYS

United States Patent Office 3,406,231
Patented Oct. 15, 1968

3,406,231
METHOD FOR PRODUCTION OF TUBULAR FIBROUS BODIES
William L. Ullman, Cherry Hill, N.J., and James C. Baxter, Minerva, Arthur J. Pearson, Granville, Robert E. Davis, Newark, and William B. Hullhorst, Rossford, Ohio, assignors to Owens-Corning Fiberglas Corporation, a corporation of Delaware
Filed Jan. 20, 1964, Ser. No. 339,007
5 Claims. (Cl. 264—145)

This invention relates generally to tubular fibrous bodies designed primarily to serve as independent ducts and thermal insulating covers but also of utility for a variety of other purposes. The invention pertains particularly to ducts and pipe insulation of fibrous glass, and methods for continuous fabrication of such products from a conventional pack of fibrous glass created by gathering and felting the fibers attenuated from molten threads in a standard fibrous glass forming operation.

The excellent performance of fibrous glass masses as thermal insulating media is widely recognized. Not only highly resistant to heat transfer fibrous glass also has exceptional strength, and is chemically inert, so able to withstand exposure to the corrosive action of moisture, mildew, insects and other destructive elements.

Previously, it has been the usual practice to build tubular members of fibrous stock in stationary matrices or molds. This is not only a time consuming, costly procedure but also limits the length of the products to the fixed dimensions of the molds. With such an arrangement there is also the objectionable irregular production movement which necessitates extra handling and intermittent storage.

Attempts to provide a more expeditious, continuous manufacturing system producing an endless tube which may be cut to any length desired have not met with substantial success. Difficulties encountered have related to maintaining the operations coordinated, uniform feeding the fibrous component, the establishment of a predetermined density, complexity and high cost of the processing equipment, and the lack of versatility of such equipment.

A prime purpose of this invention is to provide an effective, continuous process and comparatively simple and inexpensive apparatus for fabricating a constantly advancing, tubular body of bonded fibrous glass.

An important object of the invention also resides in the production of a fibrous tube of uniform characteristics including desired density and inherent strength to withstand the stresses incurred in handling, transportation and installation.

Another object embraces a method and apparatus facilitating a selective variation in the density and wall thickness of the tubular product.

An additional object resides in the provision of a process adapted to receive and directly utilize a pack of fibrous glass as delivered from a conventional fibrous glass forming station.

A further object of the invention is the provision of means for impregnating the tubular bodies with special additive materials.

Another object is a tubular product with selected areas of greater density and strength and a method of creating such a product.

A supplemental purpose of the invention is to provide means for irregular shaping of the tubular bodies.

These and other objects and advantages of the invention are secured from the improved structure of the fibrous bodies and the particular arrangement and design of the apparatus provided.

The invention primarily involves apparatus for creating a stream of glass fibers and gathering them in pack formation; coating the fibers in the stream with a bonding agent or impregnating the formed pack therewith; depositing and conveying the pack upon a belt conveyor; then helically winding and compressing the endless pack upon a smooth surfaced mandrel by means of a belt wound around the mandrel; curing the binder of the fibrous stock, and moving the wound tubular body of fibrous glass helically along the mandrel by means of the contacting, advancing turns of the belt.

Additional features and benefits of the invention will be apparent from the following description with reference to the drawings in which.

Figure 1:
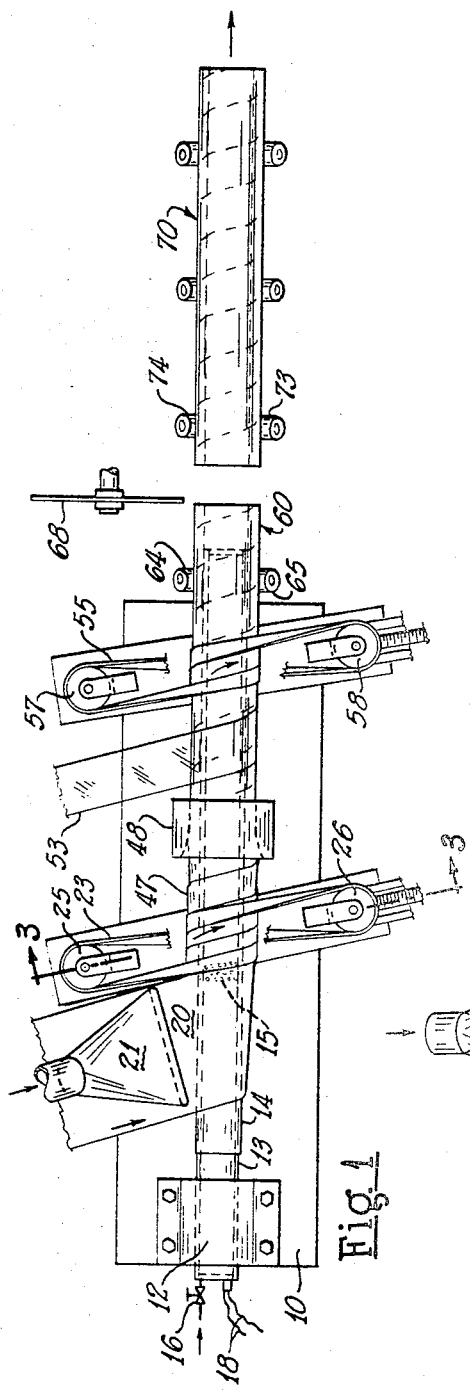
FIGURE 1 is a plan view of one form of apparatus embodying the invention.
Figure 2:
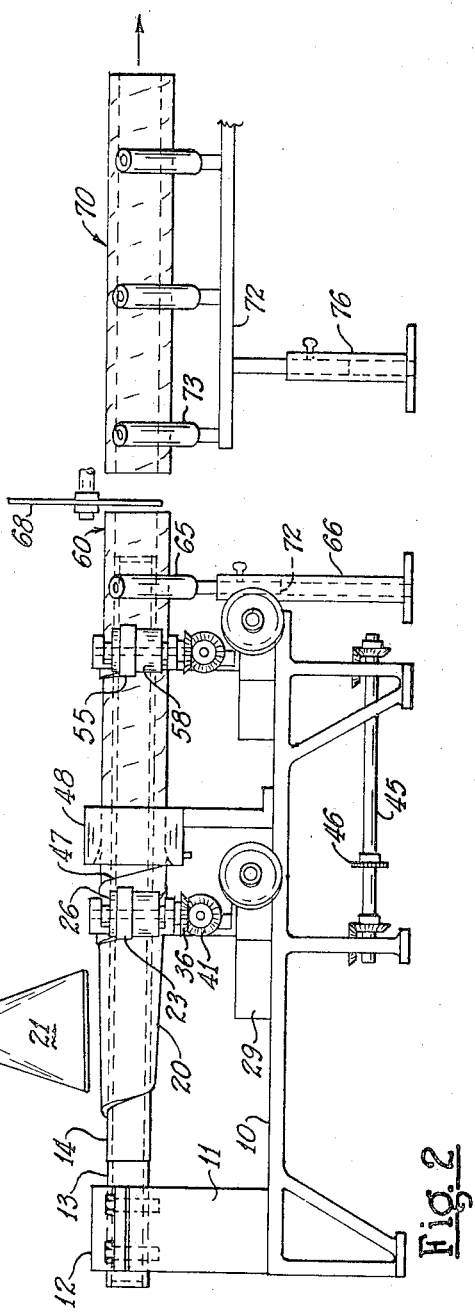
FIGURE 2 is a side elevation of the apparatus of FIGURE 1.

Referring to the drawings in more detail, the apparatus for forming tubular bodies of fibrous glass shown in FIGURES 1 and 2 includes a main platform base 10. Upon one end of the platform is an upright post 11 with a clamp 12 at its upper end forming a bore with the post for receiving and holding the horizontally disposed mandrel 13.

The hollow mandrel may, for purposes of this description of the invention, be six feet long and have a wall thickness of five sixteenths of an inch and a diameter of six inches. A length of smooth-finished standard pipe plugged at both ends serves very satisfactorily. The mandrel preferably has a slight stock releasing taper from its supported end. This reduction in diameter may be one sixteenth of an inch for each six inches of length.

Figure 4:
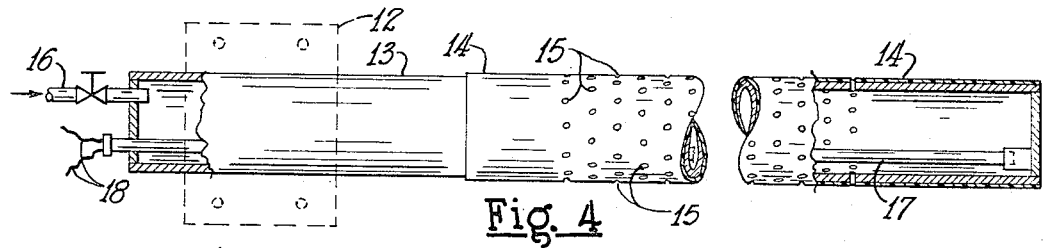
FIGURE 4 is a view of the mandrel of the apparatus of FIGURES 1, 2 and 3 shown on an enlarged scale.

Tightly fitted over the major portion of the mandrel and extending to the outer end thereof is a Teflon sleeve 14, best seen in FIGURE 4. This provides a non-adhesive surface. Sleeves or coatings of certain silicones, graphite and other materials may also be used for this lubricating or non-sticking effect. Also, non-adhesion to the mandrel may be secured by delivering the fibrous pack on a backing of fibrous glass cloth, scrim, mat, paper or screening. Such material would in addition provide an internal lining to the tubular product.

A section of the hollow mandrel 13 is perforated with a close array of ports 15 with matching ports in the Teflon sleeve 14. The ports are one sixteenth of an inch in diameter spaced one inch apart and extend over a thirty inch area lengthwise of the mandrel.

Compressed air is delivered to the interior of the mandrel through inlet 16 at the end of the mandrel mounted upon supporting post 11. Before passing out ports 15 this air is customarily heated to a temperature between 350° to 450° F. through contact with the resistant heating element 17 (FIGURE 4) positioned lengthwise within the mandrel. Electrical energy is supplied the heating element through lead wires 18.

A pack 20 of fibrous glass preferably impregnated with a heat settable binder is led at an angle and tangentially toward the stationary mandrel 13. This pack may be in a width of sixteen inches, have a general thickness of one inch and an average density of three quarters of a pound per cubic foot.

While fibrous glass is the preferred material for the products of this invention, other mineral fibers, and organic fibers, as well, in a broad range of sizes are reasonably suited for use in practicing this invention. Fairly exact control of the specifications of the glass fibers may be exercised by selection of the orifice diameters through which the molten glass is discharged in fine stream form from the forehearth of the furnace. The ingredients of the basic glass composition also may be chosen to give certain characteristics to the fibers created therefrom. The force and volume of the gaseous blasts by which the rapidly cooling molten threads are attenuated into fibers may be varied to increase or decrease their elongating effect.

However, for purposes of this invention and with consideration given the qualities desired in the tubular insulating products, a fairly fine fiber between fifteen and twenty-five hundred thousandths of an inch in diameter is preferred. A mass of such fibers has exceptional good insulating properties and is readily shaped and compacted. It should be understood that fibers in diameters as large as sixty hundred thousandths of an inch may be utilized with quite satisfactory results.

The pack 20 of fibrous glass incorporates a binder constituent, generally introduced in the forming hood, in a preferred proportion of approximately ten to fourteen percent by weight in the event a conventional formulation of phenol formaldehyde and an additive of vinsol (a resin fractionally derived distillant of southern pine) is employed. This quantity is subject to alteration depending upon the strength and porosity desired in the final product as well as upon the character of the fibers. With special more tenacious binder compositions the percent may be reduced to as little as five and one half. The binder is usually of an organic base such as phenol, urea or melamine formaldehyde, silicone, epoxy, or alkyd resins and applied in a liquid vehicle. However, powdered binders are used very successfully and inorganic and combinations of inorganic and organic are effective.

A hot air nozzle 21 is desirably positioned over the advancing pack to volatilize the liquid vehicle of the binder and to initiate the curing of the binder.

The edge of the pack 20 is directed under the first turn around the mandrel of a flat woven wire belt 23. The belt travels at an angle to the mandrel corresponding to the angle of approach of the fibrous glass pack. The belt is driven between capstans 25 and 26, the latter providing a positive drive due to a rubber coating thereon. The smooth surface of capstan 25 allows a certain amount of slippage to maintain uniform tension.

Figure 3:
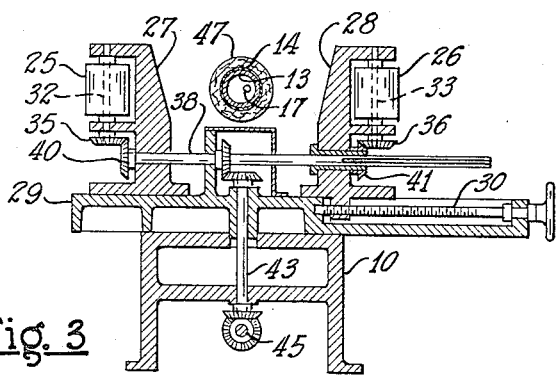
FIGURE 3 is a vertical cross section taken on line 3—3 of FIGURE 1.

For the particular embodiment of the apparatus here disclosed the capstans are eighteen inches in a diameter, have a vertical length of twenty-four inches, and are spaced five feet apart. As may be seen in FIGURE 3, the capstans 25 and 26 are rotatively mounted respectively in brackets 27 and 28. These brackets are carried on the sub-base 29 pivotably set upon the platform 10. The desired belt angle across the mandrel is obtained by turning the sub-base 29. The distance between the capstans may be varied by rotating the threaded rod 30. The greater the belt width the more the capstans should be spaced apart.

The spindles 32 and 33 of the capstans 25 and 26 have bevel gears 35 and 36 on their lower ends. From horizontal shaft 38 driving power is transferred to gears 35 and 36 through bevel gears 40 and 41 engaged therewith. In turn, shaft 38 is rotated by a bevel gearing connection with the vertical shaft 43, the latter being actuated through bevel gearing by the primary shaft 45 (FIGURE 2). This shaft 45 carries a sprocket 46 for a chain drive from a motor or an intermediate speed reducer (not shown).

With the pack of fibrous glass sixteen inches wide a twelve inch overlap of each circumferential turn of the web over the immediately preceding turn, the tubular body 47 thus formed has four layers of the pack. The tension of the belt 23 is arranged to compress the helically wrapped four layer, tubular body to a thickness of one inch. The body thus has a wall thickness of one inch and an outside diameter of eight inches. The three loops of the belt enclosing and compressing the overlapping turns of the pack not only form and compress the wrapped pack but also drive the developed cylindrical body helically along the stationary mandrel. The wall thickness of the tubular product may be varied by the amount of overlapping of each successive turn of the pack and by the thickness of the pack. The belt requires more slack for the heavier-sectioned bodies. Then, too, because of the draftability of the fibrous pack the thickness may be varied through change of the relationship between the pack delivery speed and the belt winding rate.

Figure 5:
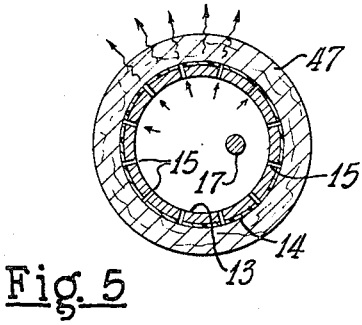
FIGURE 5 is an enlarged cross sectional view of the mandrel with a fibrous glass pack wrapped therearound.

Rapid curing of the binder of the fibrous glass is secured through the outward discharge from the interior of the mandrel through the ports 15 of air under less than a pound per square inch pressure and heated by contact with heating element 17 between 350° and 450° F. These ports extend from a point in front of the belt under the loops of the belt and some distance beyond. Since the belt is not closely woven it does not block the flow of air passing outwardly through the compressed wrapping of the pack. The radial flow of the curing air is illustrated in FIGURE 5.

While more difficult to control, an outer manifold directing heated air inwardly into the fibrous body would effect the needed curing. Also steam may be used in place of heated air. A dielectric heating field is another alternate curing means. In case it is desired to cure only the inside of the tubular body a hot unperforated mandrel would be suitable.

The cylindrical body 47 is dimensionally stabilized through the curing action as it moves out of the compressing contact with the three loops of the belt around the mandrel.

Figure 6:
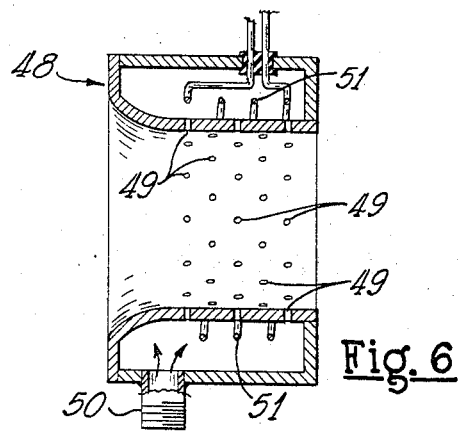
FIGURE 6 is an enlarged longitudinal and vertical section of the ironer comprising an element of the apparatus of FIGURES 1 and 2.

To smooth out irregularities in the surface of the cylindrical body and to further advance, if necessary, the curing of the binder, an ironer 48 is positioned in encircling relation to the mandrel adjacent to the belt station. As may be seen in FIGURE 6 the hollow ironer 48 has a tapered entrance to a cylindrical bore with air ports 49 spaced therearound. Compressed air entering through inlet 50 is heated by the resistance element 51 and discharged through ports 49. This air is at a higher pressure than that issuing from ports 15 in the mandrel and therefore is forced inwardly through the cylindrical body.

As an alternate or supplemental to the ironer 48, a belt sander may be placed in contact with the surface of the advancing tubular body 47 of fibrous glass to grind off irregular projections and to generally smooth the surface thereof.

A finishing film 53 is guided around the tubular body 47 as shown in FIGURE 1. This is preferably a thermoplastic which is first softened and then shrunk by the effect of the heated curing air. It is thus brought tightly against the body. It may be applied with its turns in overlapping or in edge abutting relation.

The belt 55 between capstans 57 and 58 is part of a second belt mechanism generally duplicating that including belt 23. The movement of belt 55, which may be turned only one or two times around the mandrel assists in pulling the tubular body along the mandrel and in constricting the plastic finishing film 57.

The completed tubular insulating body 60 proceeds along the mandrel from belt 55 over guide and supporting rollers 64 and 65 adjustably mounted on vertical stand 66. A diagrammatically illustrated reciprocating saw 68 cuts the continuous tubular body 60 into units 70 of selected length. These move to inspection and packing stations from the conveyor 72 comprising series of rollers 73 and 74 supported upon the stand 76.

Figure 8:
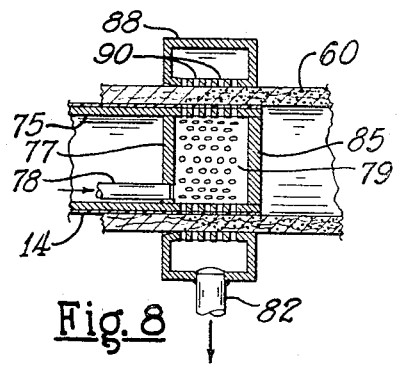
FIGURE 8 is a longitudinal sectional view of an impregnating arrangement utilizing a portion of a modified design of mandrel.

In FIGURE 8 is shown the outer end of a modified form of mandrel 75. This has the outer sleeve 14 of Teflon or coating of other material such as silicone or graphite to lubricate the movement of the cylindrical body 60 of fibrous glass along the mandrel.

A circumferentially extending band of ports 79 through the wall of the mandrel is confined within a chamber between end members 77 and 85. Extending through end member 77 is piping 78 brought into the hollow mandrel from its supported end. This provides an inlet for supplying impregnating material for the cylindrical fibrous structure.

Should it be desired to produce a heavy bodied, hot temperature serviceable product a slurry of mineral clay may be supplied through inlet 78 and forced out ports 79 into the porous interior of the fibrous structure 60 as it moves along the mandrel. This flow of slurry is aided and excess removed by suction applied through outlet 82 of the annular casing 88 positioned around the exterior of the moving cylindrical body 60. A controlled residue of the slurry is thus drawn out of the fibrous stock through holes 90 on the inner surface of the casing 88.

Dry particles for other purposes may be air borne through this circulating arrangement and implanted in the fibrous stock. Powdered mineral salts thus introduced in the fibrous stock would increase the fire resistance thereof. Particles of activated carbon would improve the air purifying action of a cylindrical filter core made from this tubular product.

Should it be desired to more heavily impregnate the outer portion of the fibrous cylinder with any such materials, this could be accomplished by reversing the flow and directing the material from the outside through casing 88 into the fibrous body.

Figure 9:
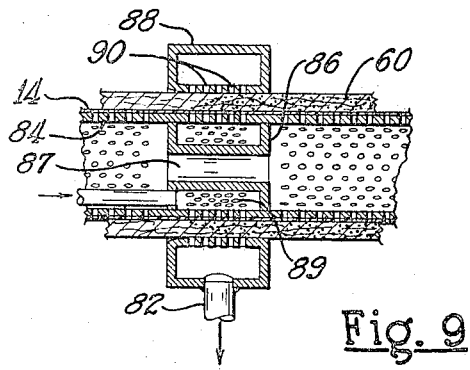
FIGURE 9 is a like view of a different form of impregnating apparatus.

Shown in FIGURE 9 is another modified form of the invention somewhat similar to that of FIGURE 8. It involves an impregnating arrangement located in or adjacent to the binder curing area of the mandrel 84 in which the mandrel is quite continuously ported for the outward flow of heated curing air. An annular member 88 is fitted tightly within the mandrel. It has an axial opening 87 to allow some of the heated curing air to continue along the interior of the mandrel for subsequent radial discharge. From an inlet pipe running from the supported end of the mandrel, fluid material or air borne particles are brought into the member 86 and forced outwardly through mandrel ports 89 into the cylindrical fibrous body 60.

The principal or a supplemental amount of the binder component either in a liquid vehicle or as dry particles may be introduced into the mass of fibers wrapped about the mandrel by the apparatus of FIGURE 9.

When the fibrous product is divided into short units for filter cores, a greater surface for exposure to the fluid to be cleaned by being moved radially through the wall of the core may be secured through shaping channels in the outer surface.

Figure 10:
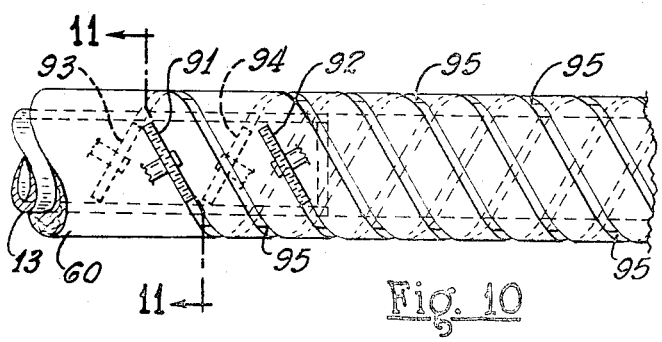
FIGURE 10 shows in side elevation, sawing devices cutting grooves in the fibrous tube as it moves along the end of the mandrel.
Figure 11:
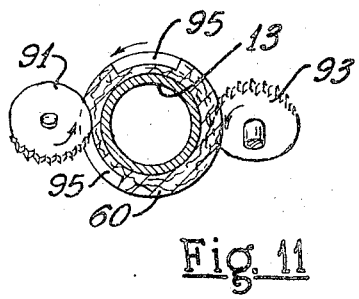
FIGURE 11 is a sectional view taken on the line 11—11 of FIGURE 10.

This may be accomplished, as demonstrated in FIGURES 10 and 11, by forming helical grooves 95 by saws or cutters in the cylindrical body as it passes in the helical path over the end of the mandrel. The body is thus supported against the cutting force by the mandrel 13. To provide operating space for the saws and still have closely arranged grooves 95, two saws 91 and 92 may be positioned on one side of fibrous body and two saws 93 and 94 placed on the opposite side.

For most products for which the tubular bodies are intended uniform strength, thickness and density throughout the bonded fibrous glass bodies is desirable. However, from the standpoint of economy and to secure special properties in the fibrous bodies, it is advantageous in some instances to so fabricate the tubular structure that it has areas of extra strength and density sufficient to maintain the product in a stabilized form and utility in spite of intermediate regions of sparse content and comparative weakness. Such regions not only effect a savings in material but also provide a flexibility of benefit in any bending required in the installation and use of the product.

An example of a tubuar body having such non-uniformity is one in which there is a helical region of extra density and strength. A body of this type may be fabricated by having the belt 23 directed around the mandrel in a helical path with an eight inch lead in each turn and delivering a pack of fibrous glass in a width of ten inches so that an edge thereof proceeds evenly under the belt and the pack follows the same helical path as the belt. With this arrangement each turn around the mandrel of the pack will overlap the preceding turn only two inches. While the compressing action of the belt 23 and the ironer 48 may establish a uniform thickness in the wall of the tubular body, there will be in the area of the overlap a narrow continuous, helical strip of double density and strength.

Figure 7:
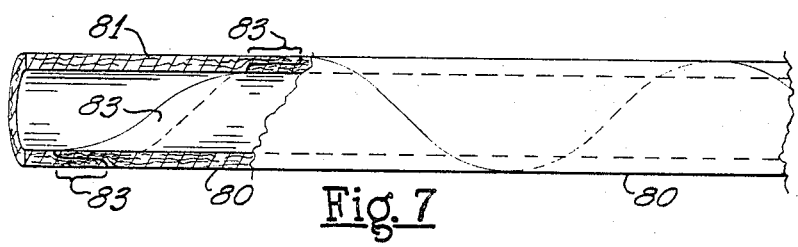
FIGURE 7 shows a portion of a particular form of a fibrous glass tubular body, partly in section, which may be produced accordingly to the invention with the apparatus illustrated in the preceding views.

As shown in FIGURE 7, the turn 80 of the pack around the mandrel is overlapped by the subsequent turn 81 creating the densified strip or rib 83. The width of this stabilizing rib may be selectively controlled within a wide range by variation of the overlap of the helical path. Additional strength may be provided in this helical strip area by inserting under the leading edge of the pack as it moves under the belt strands or strips of fibrous glass, metal, paper, plastic or by introducing settable materials in fluid form into that portion of the pack. In producing a tubular body having a densified helical rib containing two layers of the fibrous pack, the overlap of each turn of the fibrous pack over the preceding turn around the mandrel must be less than one half the width of the pack. Accordingly, the lead between adjacent turns of the pack around the mandrel should have a dimension in a range between slightly more than half the width of the pack and slightly less than the full width of the pack.

The tubular products of this invention in most cases serve as conventional air ducts or pipe insulation. With an impregnation of clay or other inert material they are capable of utility in a high temperature environment. With a smooth liner such as provided by a neoprene film deposed upon the under surface of the pack as delivered to the forming apparatus, the tubular product is particularly adapted for carrying air flow at high velocity. For underground installation the product is waterproofed by an impervious cover of plastic film or other sealing material. In shorter sections the cylindrical form of bonded fibrous glass is useful as insulating liners of containers, as dunnage for shipment, and filter cores.

While for purposes of illustration, specific designs, dimensions and compositions have been referred to herein, it should be understood that quite a broad range of specifications are adaptable to the products, apparatus and processes of this invention and that there are numerous other modifications available within the scope of this invention and the appended claims.

We claim:

1. A method of producing a tubular insulating body of fibrous glass which comprises directing a flat belt helically around a mandrel, directing a generally planar, compressible, porous pack of fibrous glass impregnated with a heat curable binder in a path tangential of the mandrel and adjacent to the belt whereby the pack is gripped and compressed between the belt and the mandrel and is pulled by the belt in a helical path around the mandrel, and the porous tubular body formed by the helical turns of the pack is advanced along the mandrel by the belt, and directing binder curing hot air under pressure outwardly from a longitudinal section of the mandrel through the tubular body and directing additional binder curing hot air from an exterior source inwardly into the porous tubular body supplementing the curing action of the hot air directed outwardly from the mandrel.

2. A method of producing a tubular insulating body of fibrous glass which comprises directing a flat belt helically around a mandrel, directing a generally planar, compressible, porous pack of fibrous glass impregnated with a heat curable binder in a path tangential of the mandrel and adjacent to the belt whereby the pack is gripped and compressed between the belt and the mandrel and is pulled by the belt in a helical path around the mandrel, and the porous tubular body formed by the helical turns of the pack is advanced along the mandrel by the belt, and directing binder curing hot air under pressure outwardly from a longitudinal section of the mandrel through the tubular body and directing additional binder curing hot air at a higher pressure from an exterior source inwardly through the porous tubular body in overcoming opposition to a portion only of the hot air directed outwardly from the mandrel.

3. A method of producing a tubular insulating body of fibrous glass which comprises directing a flat belt helically around a mandrel and directing a generally planar, compressible pack of fibrous glass impregnated with a heat curable binder in a path tangential of the mandrel and adjacent to the belt as the belt approaches and starts to turn around the mandrel whereby the pack is gripped and compressed between the belt and the mandrel and is pulled by the belt in a helical path around the mandrel, and the tubular body formed by the helical turns of the pack is advanced along the mandrel by the belt, the lead of the helical path of the pack around the mandrel being in a range lying between slightly more than half the width of the pack and slightly less than the full width of the pack whereby the tubular body has alternate helical areas of single and double layers of the pack due to the overlapping of each turn of the fibrous pack over less than one-half of the width of the preceding turn thereof around the mandrel.

4. A method of producing a tubular insulating body of fibrous glass which comprises directing a flat belt helically around a mandrel and directing a generally planar compressible porous pack of fibrous glass impregnated with a heat curable binder in a path tangential of the mandrel and adjacent to the belt as the belt approaches and starts to turn around the mandrel whereby the pack is gripped and compressed between the belt and the mandrel and is pulled by the belt in a helical path around the mandrel, and the porous tubular body formed by the helical turns of the packed is advanced along the mandrel by the belt, and forcing impregnating material into the porous tubular body as it is advanced along the mandrel.

5. A method of producing a tubular insulating body of fibrous glass which comprises directing a flat belt helically around a mandrel and directing a generally planar compressible pack of fibrous glass impregnated with a heat curable binder in a path tangential of the mandrel and adjacent to the belt whereby the pack is gripped and compressed between the belt and the mandrel and is pulled by the belt in a helical path around the mandrel, and the tubular body formed by the helical turns of the pack is advanced along the mandrel by the belt, and cutting a helical groove in the outer surface of the tubular body as the body is advanced along the mandrel.

References Cited

UNITED STATES PATENTS

| | | |
|---|---|---|
| 1,034,915 | 8/1912 | Kaiser. |
| 2,262,636 | 11/1941 | Cuno. |
| 2,321,738 | 6/1943 | Farny. |
| 2,371,224 | 3/1945 | Cumfer _____ 242—11 X |
| 2,997,739 | 8/1961 | Smith et al. _____ 18—6 |
| 3,140,968 | 7/1964 | Barrios et al. _____ 242—11 X |
| 982,430 | 1/1911 | Jenkins. |
| 1,648,475 | 11/1927 | Darwin. |
| 2,790,464 | 4/1957 | Stephans et al. |
| 3,112,895 | 12/1963 | Kinney _____ 242—7 |

A. R. NOE, *Primary Examiner.*

R. KUCIA, *Assistant Examiner.*